US008850380B2

(12) United States Patent
Bickford et al.

(10) Patent No.: US 8,850,380 B2
(45) Date of Patent: Sep. 30, 2014

(54) SELECTIVE VOLTAGE BINNING WITHIN A THREE-DIMENSIONAL INTEGRATED CHIP STACK

(71) Applicant: International Business Machines Corporation, Armonk, NY (US)

(72) Inventors: Jeanne P. Bickford, Essex Junction, VT (US); Eric A. Foreman, Fairfax, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/766,276

(22) Filed: Feb. 13, 2013

(65) Prior Publication Data

US 2014/0229909 A1   Aug. 14, 2014

(51) Int. Cl.
*G06F 17/50* (2006.01)
(52) U.S. Cl.
CPC ................................. *G06F 17/5068* (2013.01)
USPC .......................................... 716/136; 716/100
(58) Field of Classification Search
CPC ..... G06F 9/3867; G06F 9/3869; G06F 17/50; G06F 17/5018; G06F 17/5045; G06F 17/30241; G06F 17/30244; G06F 17/30256; G06F 17/30265; G06F 17/30867; G06F 17/3087; G06F 17/30879; G06F 15/803; H04N 1/00328; H04N 1/00331; H04N 1/00336; G03F 7/705
USPC .................................. 716/100–102, 136–139
See application file for complete search history.

(56) References Cited

U.S. PATENT DOCUMENTS

2007/0055487 A1* 3/2007 Habitz et al. .................... 703/19

OTHER PUBLICATIONS

Agarwal, A. et al., "Path-Based Statistical Timing Analysis Considering Inter- and Intra-Die Correlations", Motorola Inc., 2002, pp. 1-5.
Heloue, K. et al., "Effect of Statistical Clock Skew Variations on Chip Timing Yield", University of Toronto, IEEE, 2005, 4 pages.
Yu, S. et al., "A Multiple Supply Voltage Based Power Reduction Method in 3-D ICs Considering Process Variations and Thermal Effects", National Chiao Tung University, IEEE, 2009, pp. 55-60.
Garg, S. et al., "3D-GCP: An Analytical Model for the Impact of Process Variations on the Critical Path Delay Distribution of 3D ICs", Carnegie-Mellon University, 2009, 9 pages.
Ferri, C. et al., "Parametric Yield Management for 3D ICs: Models and Strategies for Improvement", ACM Journal on Emerging Technologies in Computing Systems, vol. 4, No. 4, Article 19, Oct. 2008, 22 pages.

(Continued)

*Primary Examiner* — Binh Tat
(74) *Attorney, Agent, or Firm* — David Cain; Roberts Mlotkowski Safran & Cole, P.C.

(57) ABSTRACT

Systems and methods for selective voltage binning within a three-dimensional integrated chip stack. A method is provided that includes defining a correlation between at least two parameters. At least one parameter of the at least two parameters is from a first chip of a three-dimensional integrated chip stack and at least one parameter of the at least two parameters is from a second chip of the three-dimensional integrated chip stack. The method further includes generating a covariance matrix based on the at least two parameters. The method further includes calculating a new parameter or new parameter set using the covariance matrix. The method further includes performing statistical static timing analysis (SSTA) such that the new parameter or the new parameter set is propagated into the SSTA. The method further includes determining whether timing targets for the three-dimensional integrated chip stack are achieved.

8 Claims, 6 Drawing Sheets

(56) References Cited

OTHER PUBLICATIONS

Xu, T. et al., "A Resonance-Free Power Delivery System Design Methodology Applying 3D Optimized Extended Adaptive Voltage Positioning", Sigrity Inc., IEEE, 2008, pp. 107-110.

Kraft, J. et al., "3D sensor Application with Open Through Silicon Via Technology", 2011 Electronic Components and Technology Conference, IEEE, 2011, pp. 560-566.

Quevy E. et al., "A new actuation structure for the deformation of continuous mirrors for adaptive optics", Proceedings of SPIE, vol. 4407, 2001, pp. 221-229.

Thollin, B. et al., "Development and Electrical Characterization of a Vertical Electrical and Thermal Test Chip (VTTC)", Crown, 2011, pp. 60-67.

Mondal, M. et al., "Efficient Hierarchical Discretization of Off-chip Power Delivery Network Geometries for 2.5D Electrical Analysis", 11th Int'l Symposium on Quality Electronic Design, IEEE, 2010, 8 pages.

* cited by examiner

300

| 3D Chip Stack | Chip A SVB Bin | Chip B SVB Bin | Chip C SVB Bin | No. Voltage Regulators | Correlation Determination |
|---|---|---|---|---|---|
| 1 | 14 | 14 | 14 | 3 | 100% |
| 2 | 14 | 13 | 15 | 2 | 90% |
| 3 | 14 | 1 | 7 | 1 | 0% |
| 4 | 14 | 9 | 12 | 3 | 50% |

FIG. 4

SELECTIVE VOLTAGE BINNING WITHIN A THREE-DIMENSIONAL INTEGRATED CHIP STACK

FIELD OF THE INVENTION

The invention relates to three-dimensional (3D) integrated chip stacking and, more particularly, to systems and methods for selective voltage binning within a 3D integrated chip stack.

BACKGROUND

As semiconductor designers continually look to increase the functionality of integrated chips, the size of logic components on the integrated chip is continually being pushed into the realm of smaller technology nodes to fit the functionality into smaller areas. Conventionally, only two-dimensional (2D) planes were used to integrate more functionality into a smaller area through the use of conventional complementary metal oxide semiconductor (CMOS) scaling, multiple IP cores in a single die (System-on-Chip, SoC), multiple dies in a single package (Multi-Chip Package, MCP), and multiple integrated circuits (ICs) on a printed Circuit Board (PCB).

More recently, the third-dimension (e.g., the vertical dimension) has started to become exploited to integrate even more functionality into a smaller area through the use of System-in-Package (SiP) technology, in which multiple dies or chips are vertically stacked in a single IC package (e.g., a chip on chip configuration), and interconnected by means of wire-bonds to the substrate, and Package-on-Package (PoP) technology, in which multiple packaged chips are vertically stacked. The 3D stacking of chips not only offers a smaller physical package but also shortens wires, which can allow for higher performance.

As with conventional 2D integrated chips, these new 3D integrated chips could benefit from a reduction in parametric yield loss. Specifically, process variation across integrated chips is recognized as a major source of parametric yield loss, which occurs because a fraction of manufactured integrated chips (conventional 2D integrated chips or newer 3D integrated chips) do not satisfy timing or power constraints of the customer. On the other hand, both integrated chip performance and integrated chip leakage power depend on supply voltage. This dependence can be used for converting the fraction of too slow or too leaky integrated chips into acceptable integrated chips by adjusting their supply voltage. This technique is called selective voltage binning (SVB).

SVB is used widely in the semiconductor industry for minimizing power consumption of integrated chips while optimizing supply voltage across a predetermined process space. SVB depends upon the integrated chips being divided into groups (bins) and each group is assigned its individual process space. During manufacture of the integrated chips, the individual process space is burned into the integrated chip using an electronic chip identifier (ECID) such that each integrated chip knows the process space under which it falls. Therefore, for example, if the integrated chip knows it falls under a slow process space, the integrated chip can set its supply voltage high using a voltage regulator, or alternatively, if the integrated chip knows it falls under a fast process space, the integrated chip can set its supply voltage low using the voltage regulator. In any event, the purpose of the SVB is for the integrated chip to be configured to set its supply voltage to minimize leakage based on its assigned process space.

However, with a 3D integrated chip stack, there is the possibility for multiple ECIDs and multiple voltage rails for each chip in the 3D integrated chip stack. Therefore, a problem arises as to how a 3D integrated chip stack should be configured to set the one or more supply voltages when there are multiple different speeds across multiple process spaces.

Accordingly, there exists a need in the art to overcome the deficiencies and limitations described hereinabove.

SUMMARY

In a first aspect of the invention, a method is provided that includes defining a correlation between at least two parameters. At least one parameter of the at least two parameters is from a first chip of a three-dimensional integrated chip stack and at least one parameter of the at least two parameters is from a second chip of the three-dimensional integrated chip stack. The method further includes generating a covariance matrix based on the at least two parameters. The method further includes calculating a new parameter or new parameter set using the covariance matrix. The method further includes performing statistical static timing analysis (SSTA) such that the new parameter or the new parameter set is propagated into the SSTA. The method further includes determining whether timing targets for the three-dimensional integrated chip stack are achieved.

In another aspect of the invention, a method is provided for binning integrated chips of a three dimensional integrated chip stack. The method includes defining at least one of a process parameter and a voltage parameter for each of the integrated chips of the three dimensional integrated chip stack during design of the three-dimensional integrated chip stack. The method further includes closing timing for the three-dimensional integrated chip stack to a frequency limit across the design of the three-dimensional integrated chip stack using at least one process or voltage assumption for each bin of a selective voltage binning plan for the three-dimensional integrated chip stack.

In yet another aspect of the invention, a system is provided for binning integrated chips of a three dimensional integrated chip stack. The system includes a CPU, a computer readable memory and a computer readable storage media. The system further includes first program instructions to assign at least one of a process parameter and a voltage parameter for each of the integrated chips of the three dimensional integrated chip stack during design of the three-dimensional integrated chip stack. The system further includes second program instructions to correlating a relationship between each of the at least one of the process parameter and the voltage parameter for each of the integrated chips during timing analysis. The system further includes third program instructions to close timing for the three-dimensional integrated chip stack to a frequency limit across the design of the three-dimensional integrated chip stack using at least one process or voltage assumption for each bin of a selective voltage binning plan for the three-dimensional integrated chip stack. The first, second, and third program instructions are stored on the computer readable storage media for execution by the CPU via the computer readable memory.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

FIG. 4 is an illustration that shows an exemplary manufacturing sorting plan in accordance with aspects of the invention;

DETAILED DESCRIPTION

Figure 1:
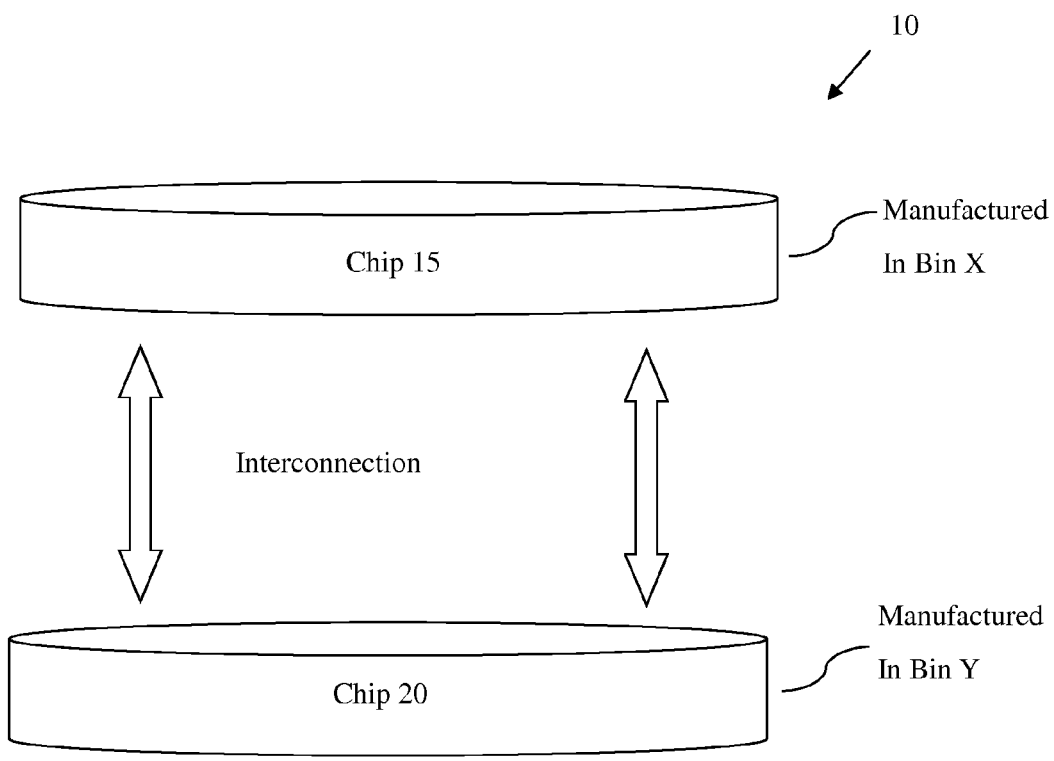
FIG. 1 shows a 3D integrated chip stack with two chips interconnected in accordance with aspects of the invention.

The invention relates to three-dimensional (3D) integrated chip stacking and, more particularly, to systems and methods for selective voltage binning within a 3D integrated chip stack. More specifically, implementations of the invention provide a method for SVB of 3D integrated chip stacks by using a correlation between at least two parameters, e.g., a correlation between a first parameter (e.g., a mask-forming process parameter, an etching process parameter, a lithography process parameter, a voltage parameter, etc.) for a first chip in a 3D integrated chip stack and a second parameter (e.g., a mask-forming process parameter, an etching process parameter, a lithography process parameter, a voltage parameter, etc.) for a second chip in the 3D integrated chip stack, in static timing analysis (STA) (e.g., a statistical static timing analysis (SSTA)). In embodiments, a covariance matrix may be generated for the at least two parameters to compute a new parameter or new parameter set, which can then be used to close timing of the 3D integrated chip stack to a frequency limit across the design using a voltage binning process plan (SVB plan).

Advantageously, the systems and methods described herein for performing SVB allows systems to be optimized to meet desired performance across multiple chips stacked together, and results in a lowest power needed to meet performance for each bin represented in the chip stack. Advantageously, the systems and methods also improve runtime and memory of electronic design automation (EDA) tools, while maintaining accuracy (e.g., eliminates a need to guard band or margin across a worst process space identified for the whole chip stack). Additional advantages include the ability to extend SVB for chip stacks comprising multiple voltage regulators and for multiple binning plans.

In accordance with aspects of the invention, the systems and methods of performing SSTA based on process and/or voltage parameters and binning plans for a 3D integrated chip stack are hereafter discussed in detail as they pertain to the exemplary use in SVB during integrated circuit manufacturing. However, those of ordinary skill in the art should understand that the use of the systems and methods described herein with respect to selective voltage binning is illustrative of one exemplary use and that other uses (e.g., other types of process binning) for the systems and methods described herein are contemplated by the invention, all of which do not depart from the scope and spirit of the invention. Moreover, those of ordinary skill in the art should understand that although the systems and processes described herein refer to SSTA and binning plans for 3D integrated chips stacks (e.g., a vertical chip stack, chip on chip package, or multiple chips in a common package (where the substrate is the connector)), the systems and processes described herein may also be applicable to other semiconductor product configurations or designs such as cards on boards where the cards may require a common process point.

SVB is a performance screen ring oscillator (PSRO)-based screening process of high performance chips into process or voltage bins. SBV takes into consideration that chip performance and chip leakage depend on supply voltage of the chip, and that dependency can be used to convert slow or leaky chips into acceptable chips by tweaking the supply voltage. In SVB, the manufactured chips are tested using oscillator rings for an average frequency of the chip. Bins are assigned a range of frequencies or a supply voltage necessary for compensating for the slow or fast frequencies, and the tested chips are sorted and placed into corresponding bins. The supply voltage of each chip in the corresponding bins may then be adjusted using a voltage regulator to compensate for process effect to chip performance and leakage. For example, the supply voltage may be increased when the process parameter decreases.

In conventional SVB for integrated chips, the timing of a circuit path propagates through a single chip, and process and voltage for the single chip are capable of being parameterized to create voltage parameter variations within a single statistical timing run (STA or SSTA). Therefore, in a conventional STA or SSTA timing run, it is possible to observe how timing behaves as the process and voltage parameters are moved to different process corners.

However, with multiple integrated chips stacked together, the timing may be propagating through a circuit path that extends from one die or chip to another die or chip. Thus, in actuality two or more parameters (e.g., a first process parameter for the first die or chip and a second process parameter for the second die or chip) may be propagated from a single chip stack. Thus, during a STA or SSTA timing run, sensitivities may be calculated for the first part of the path through the first die or chip for the first process parameter and for the second process parameter (the second process parameter would be equal to zero at this stage of the timing analysis). Sensitivities may also be calculated for the second part of the path through the second die or chip by carrying along the first process parameter and calculating the second process parameter. Additionally, when a final capture latch is arrived at during the timing run, there could potentially be one or more voltage sensitivities calculated depending on whether one or more voltage rails were defined for the two dies or chips. Thus, the timing run for the chip stack may result in a statistical canonical model with sensitivities to the first process and the second process, and potentially sensitivities to one or more of the voltages.

In embodiments of the present invention, in order to overcome the problem of having these multiple sensitivities calculated for a single chip stack, a covariance matrix may be applied such that timing closure becomes more closely tied to manufacturing. For example, in the instance of manufacturing a chip stack comprising a chip (a) and a chip (b), a design plan may be developed such that all of the manufactured chips (a) and chip (b) may be sorted in a manner where all of the fast chips (a) and all of the fast chips (b) are kept together as much as possible (e.g., 90% of the time), and all of the slow chips (a) and all of the slow chips (b) are kept together as much as possible (e.g., 90% of the time). Therefore, when developing a binning plan (e.g., developing a binning plan with 4 or 16 bins) for the manufacture of the chip stack, part of the binning plan solution identifies the chip stack being manufactured and the sorting plan that fits with the binning plan such that chip (a) and chip (b) are correlated a certain percentage of the time (e.g., 90%). Thus, a manufactured chip stack should never ship to a customer that does not fit in this correlated requirement.

Accordingly, in the timing run for the chip stack, a correlation matrix may be defined to essentially state how well (e.g., 90%) the parameter from chip (a) is correlated to the parameter for chip (b). Thus, when timing is propagated through STA or SSTA, the correlation between the two parameters can be propagated such that there is no independence between the two parameters.

In embodiments, the correlation between the multiple parameters may be used to compute a new parameter. Specifically, the one or more supply voltages and/or the one or more process parameters form a joint probability distribution such that when the parameters are correlated a smaller subspace of distribution is achieved than when the parameters are not correlated. The new parameter can then be used to close timing to the frequency limit across the design using the identified voltage binning process plan by essentially taking a vector of the data and projecting the correlated parameters into a parameter subspace that represents voltage high as a slow chip and voltage low as a fast chip.

For example, FIG. 1 shows a 3D integrated chip stack 10 with two chips 15 and 20 interconnected. Chip 15 may be manufactured and determined to be in Bin X of the manufacturing process, and Chip 20 may be manufactured and determined to be in Bin Y of the manufacturing process. The large arrows show that the two chips may be connected with some interconnect to create the chip stack 10. During manufacturing, the chips 15 and 20 may be sorted such that the preferable bins from each respective chip were chosen for the chip stack 10. When SSTA is performed, a unique process variable may be used to represent the process for chip 15 and a second unique process variable may be used to represent the process for chip 20. This may be done such that the binning/wafer selection correlates the timing closure of the two process variables in the interconnected chip stack 10.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
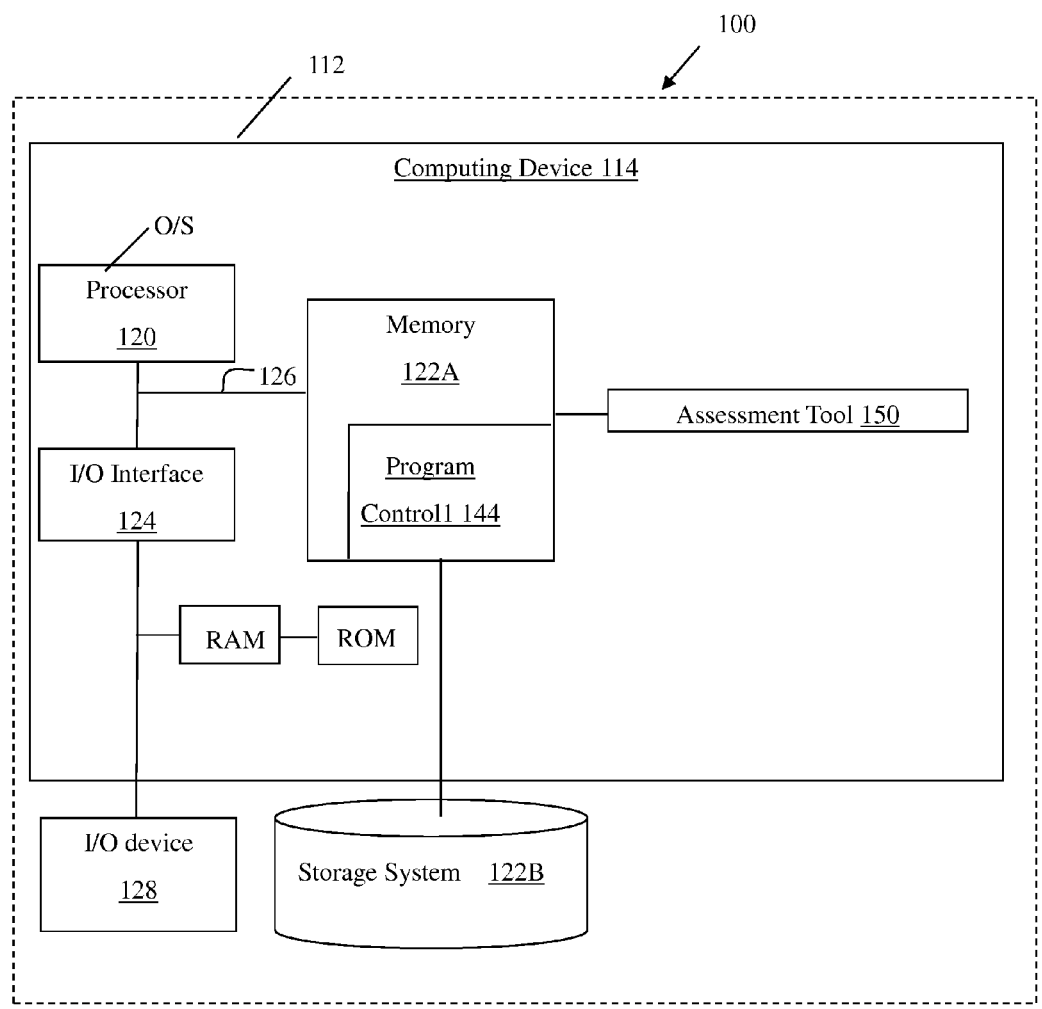
FIG. 2 is an illustrative external environment for implementing the invention in accordance with aspects of the invention.

FIG. 2 shows an illustrative environment 100 for managing the processes in accordance with the invention. To this extent, the environment 100 includes a server or other computing system 112 that can perform the processes described herein. In particular, the server 112 includes a computing device 114. The computing device 114 can be resident on a network infrastructure or computing device of a third party service provider (any of which is generally represented in FIG. 2).

The computing device 114 also includes a processor 120, memory 122A, an I/O interface 124, and a bus 126. The memory 122A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 114 is in communication with the external I/O device/resource 128 and the storage system 122B. For example, the I/O device 128 can comprise any device that enables an individual to interact with the computing device 114 (e.g., user interface) or any device that enables the computing device 114 to communicate with one or more other computing devices using any type of communications link. The external I/O device/resource 128 may be for example, a handheld device, PDA, handset, keyboard, etc.

In general, the processor 120 executes computer program code (e.g., program control 144), which can be stored in the memory 122A and/or storage system 122B. Moreover, in accordance with aspects of the invention, the program control 144 controls an assessment tool 150 to perform the processes described herein. The assessment tool 150 can be implemented as one or more program code in the program control 144 stored in memory 122A as separate or combined modules. Additionally, the assessment tool 150 (e.g., an EDA tool) may be implemented as separate dedicated processors or a single or several processors to provide the function of this tool. While executing the computer program code, the processor 120 can read and/or write data to/from memory 122A, storage system 122B, and/or I/O interface 124. The program code executes the processes of the invention. The bus 126 provides a communications link between each of the components in the computing device 114.

In embodiments, the assessment tool 150 can obtain at least two parameters and define a covariance matrix comprising the at least two parameters for SSTA timing analysis and, thereafter, close timing to a frequency limit across a 3D integrated chip stack design using a voltage binning process plan. For example in accordance with aspects of the invention, the assessment tool 150 can define at least one of a process parameter and a voltage parameter for each of the integrated chips of a 3D integrated chip stack during design of the 3D integrated chip stack, correlate a relationship between each of the at least one of the process parameter and the voltage parameter for each of the integrated chips during timing analysis, and close timing for the 3D integrated chip stack to a frequency limit across the design of the 3D integrated chip stack using at least one process or voltage assumption for each bin of a selective voltage binning plan for the 3D integrated chip stack.

Flow Diagram

Figure 3:
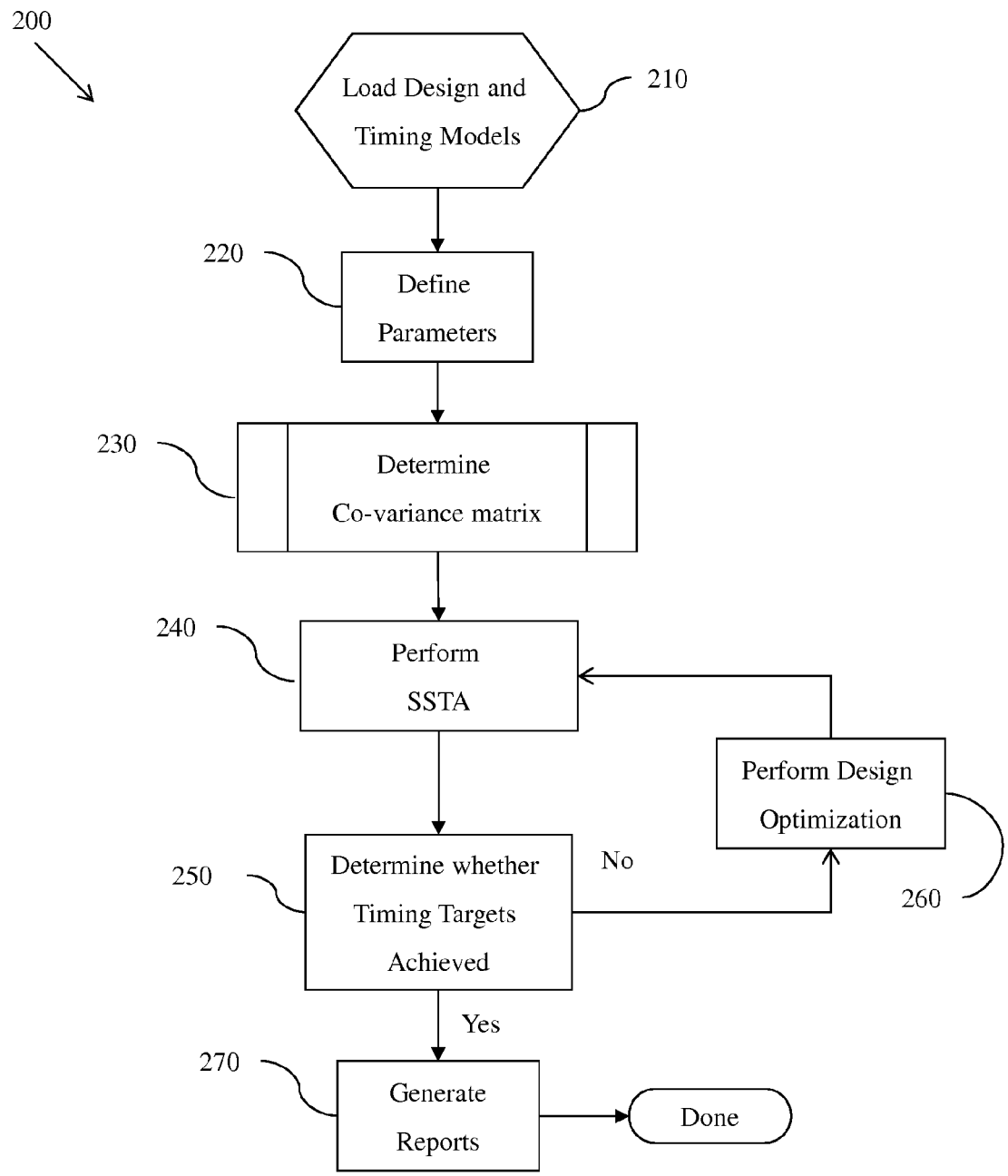
FIG. 3 is an illustrative process flow of implementing the system in accordance with aspects of the invention.
Figure 5:
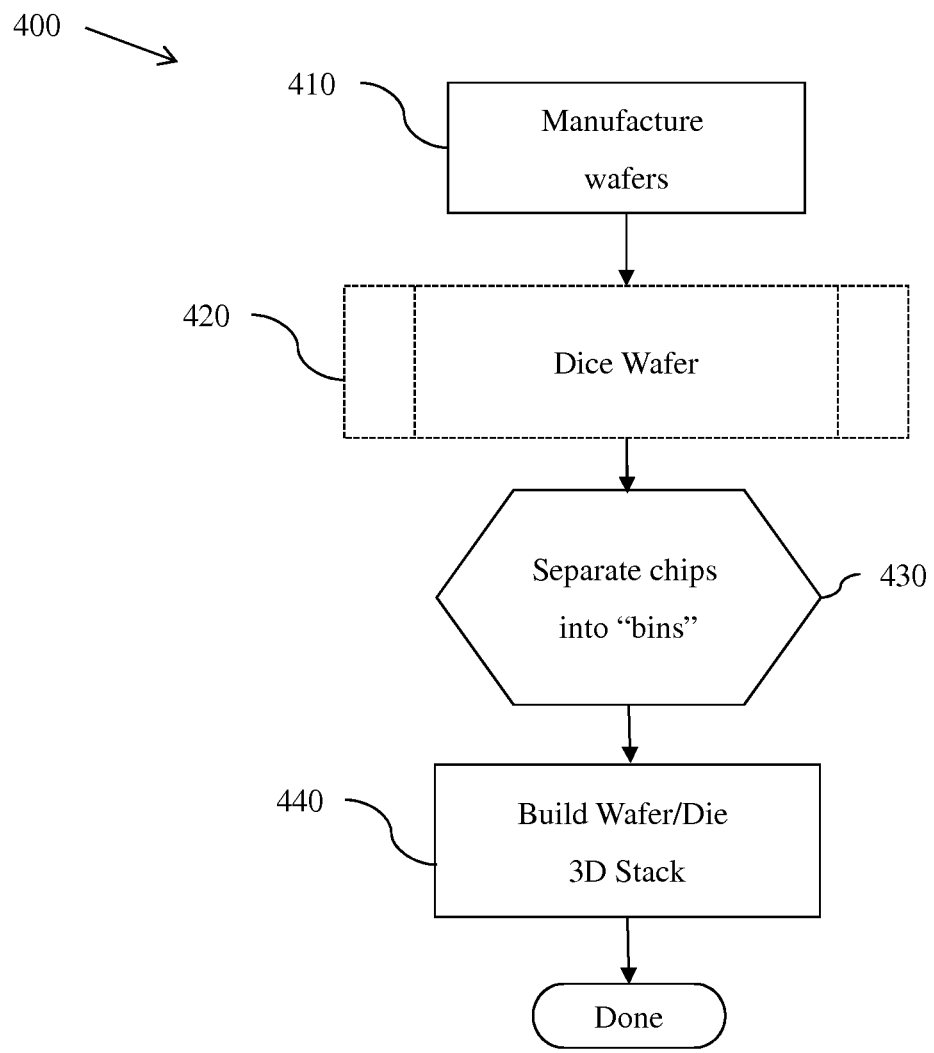
FIG. 5 is an illustrative process flow of implementing the system in accordance with aspects of the invention.

FIGS. 3 and 5 show exemplary flows for performing aspects of the present invention. The steps of FIGS. 3 and 5 may be implemented in the environment of FIG. 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

In embodiments, as shown in FIG. 3, a covariance matrix may be generated for at least two parameters of a 3D integrated chip stack or specified testing regions of the 3D integrated chip stack to compute a new parameter or a new parameter set, which can then be used to close timing for the 3D integrated chip stack. In accordance with aspects of the invention, the systems and methods of semiconductor design 200 for closing timing of the 3D integrated chip stack may use statistical timing to model process variation of the 3D integrated chip stack or the specified testing regions of the 3D integrated chip stack.

At step 210, design and timing models for the 3D integrated chip stack or the specified testing region of the 3D integrated chip stack may be loaded into a computing device. For example, a design structure and timing models for the 3D integrated chip stack or specified testing region of the 3D integrated chip stack may be loaded into assessment tool 150 (as discussed with regard to FIG. 2).

At step 220, at least two parameters of a 3D integrated chip stack or specified testing regions of the 3D integrated chip stack may be defined based on a selected voltage binning plan and the design constraints of the 3D integrated chip stack. For example, the defining of the at least two parameters of the chip stack may depend on how the SVB plan is constructed (e.g., whether 4 or 16 voltage bins will be used) and how the chip stack is being put together (e.g., the number of chips involved, the number of voltage rails involved, the number of voltage regulators used, whether there is voltage step logic, etc.)

In embodiments, the at least two parameters may include one or more process parameters (e.g., process sensitivities or process sources of variation that result from a mask-forming process, an etching process, a lithography process, etc.) and/or one or more voltage parameters (e.g., voltage sensitivities or voltage sources of variation) for the at least two chips that make up the 3D integrated chip stack. For example, in the design of a 3D integrated chip stack that comprises three chips with a separate voltage regulator for each chip, a separate process parameter may be defined for each chip within the stack and a separate voltage parameter may be defined for each voltage regulator within the stack. Thus, in this example, three process parameters and three voltage parameters may be defined for the 3D integrated chip stack.

At step 230, a correlation matrix between the at least two parameters may be generated, and a new parameter or a new parameter set may be calculated based on a linear combination of the at least two parameters. For example, a user or the assessment tool 150 may determine or specify a correlation between the at least two parameters of the integrated circuit 3D integrated chip stack, and the assessment tool 150 may then generate a correlation matrix for the defined or specified correlation to be used in a timing analysis.

In embodiments, the correlation between the at least two parameters may be determined by the assessment tool looking up correlations based on a manufacturing sorting plan 300, as shown in FIG. 4. For example, a customer may define a manufacturing sorting plan 300 such that any first chip (e.g., Chip A) of the 3D integrated chip stack 1 screened or identified at a certain speed (e.g., a Chip A that is screened as a fast chip falling under bin 14 in a 16 SVB plan) is always binned with any second chip (e.g., Chip B) of the 3D integrated chips stack that is also screened at substantially the same speed (e.g., a Chip B that is screened as a fast chip falling under bin 14 in the 16 SVB plan), and any third chip (e.g., Chip C) of the 3D integrated chip stack that is screened at substantially the same speed (e.g., a Chip C that is screened as a fast chip falling under bin 14 in the 16 SVB plan). This type of manufacturing sorting plan may be determined by the assessment tool 150 as a 100% correlation between the integrated chips because the customer always wants substantially the same speed chips matched together within a chip stack (e.g., "fast" chips matched together and "slow" chips matched together). However, as can been seen in FIG. 4 there are a number of scenarios in which different correlation determinations may be made based on the sorting plan of the customer.

In embodiments, the assessment tool 150 may then generate a covariance matrix indicative of the correlated at least two parameters (e.g., process and/or voltage parameters) and correlation specified or determined for the at least two parameters. For example the covariance matrix may include a combination of correlation coefficients for the at least two parameters. In accordance with aspects of the invention, the correlation coefficients (ρ) may be calculated using the following formula (1).

$$\rho(x, y) = \frac{E(x, y) - E(x)E(y)}{\sigma_x \sigma_y} = \mathcal{R}; \neq 0 \quad (1)$$

where: $x$ = the first parameter;
$y$ = the second parameter;
$E$ = an expected value;
$\sigma$ = a standard deviation; and
$\mathcal{R}$ = real numbers.

In embodiments, a new parameter "X" that is a linear combination of the at least two parameters or a new parameter set "X1" and "X2" that is a transformation of the at least two parameters may then be calculated using the following formula (2). For example, if the at least two parameters have 100% correlation, then they reduce to one parameter "X." However if the at least two parameters have a correlation not equal to 100%, then there will be two new parameters or a new parameter set calculated (e.g., this is referred to as parameter transform). In embodiments, if you have 100% correlation, where ρ=1 or ρ=−1, then you have the parameters collapse into a single parameter.

If ρ=1 or −1, then X=α₁y+β₁z (Parameter Collapsing)

If ρ≠1 or −1, then X1=α₁y+β₁z and X2=α₂y+β₂z (Parameter Transforming) (2)

where:
α₁=a multiplier for linear combination sensitivities;
β₁=a multiplier for liner combination sensitivities;
α₂=a multiplier for linear combination sensitivities;
β₂=a multiplier for liner combination sensitivities;
y=the first parameter; and
z=the second parameter.
(It should be understood to those of ordinary skill in the art that the multipliers (e.g., α₁, β₁, α₂, and β₂ may be computed using standard math procedures such as a matrix transform or principal component analysis.)

At step 240, an SSTA may be performed for the chip stack that propagates the new parameter "X" or the new parameter set "X1" and "X2" into the timing analysis. For example, an SSTA for the chip stack may be performed that computes a statistical approximation of the circuit timing characteristics, e.g., arrival times, required arrival times, delay, and timing slack, as functions of the same parameters. Specifically, canonical delays may be calculated and then propagated to obtain arrival times, required arrival times, and timing slack that take into consideration the new parameter "X" or the new parameter set "X1" and "X2" rather than the at least two parameters separately or individually.

In embodiments, the SSTA includes closing timing for the chip stack to a frequency limit across the design of chip stack using at least one process or voltage assumption for each bin of the SVB plan for the chip stack. The process assumption represents where the bin sits within the distribution and the voltage assumption represents how the chip operation condition should be set for power/performance optimization. The general calculating of the SSTA for the chip stack and timing closure would be known to one of ordinary skill in the art such that further explanation is not required.

At step 250, a determination is made based on a comparison of the SSTA results obtained in step 240 with predetermined timing targets as to whether the predetermined timing targets (e.g., timing targets specified by the customer for the chip stack design) are achieved. If the timing targets are achieved, then the SSTA results may then be projected to a binning subspace specified (e.g., fast chips→low voltage bin and slow chips→high voltage bin), or split up depending on however many bins are defined in the SVB plan (e.g., a 4 or 16 bin plan). If the timing targets are not achieved, then at step 260 design optimization may be performed on the net list to close timing targets (e.g., achieve 0 slack) as should be known to one of ordinary skill in the art such that further explanation is not required.

At step 270, reports may be generated. For example, the assessment tool 150 may generate reports comprising any timing quantity including the required arrival times, the arrival times, the slack projection, and the transition time or slew rate for the chip stack obtained from the SSTA.

In embodiments, as shown in FIG. 5, the systems and methods of manufacturing a chip stack 400 may use the correlation between supply voltage and the process parameter to separate individual chips into voltage bins based on a SVB plan, and assemble the chip stack based on the manufacturing sorting plan such that the multiple chips that make up the chip stack are correlated a certain percentage of the time (e.g., 100%).

At step 410, individual wafers are manufactured based on customer design constraints. The individual wafers may be manufactured to comprise a number of integrated circuits and microelectronic devices (e.g., a memory chip) built in and over the wafer through a number of microfabrication processes including doping, etching, deposition, and photolithographic patterning. Optionally at step 420, the individual wafers may be diced into multiple dies, which are basically a small block of semiconductor material comprising a given fabricated functional circuit (e.g., a memory chip). The dicing process may be accomplished by scribing and breaking, by mechanical sawing (normally with a machine called a dicing saw), or by laser cutting.

At step 430, the individual wafers or dies are separated into separate bins (e.g., slow, fast, etc. voltage bins) depending on the SVB plan and the manufacturing sorting plan. At step 440, the 3D integrated chip stack may be built to maintain the manufacturing sorting plan where the multiple chips that make up the chip stack remain correlated (e.g., 100%) based on customer requirements. Thus, advantageously a manufactured chip stack should never ship to a customer that does not fit in the customer's correlated requirements.

Figure 6:
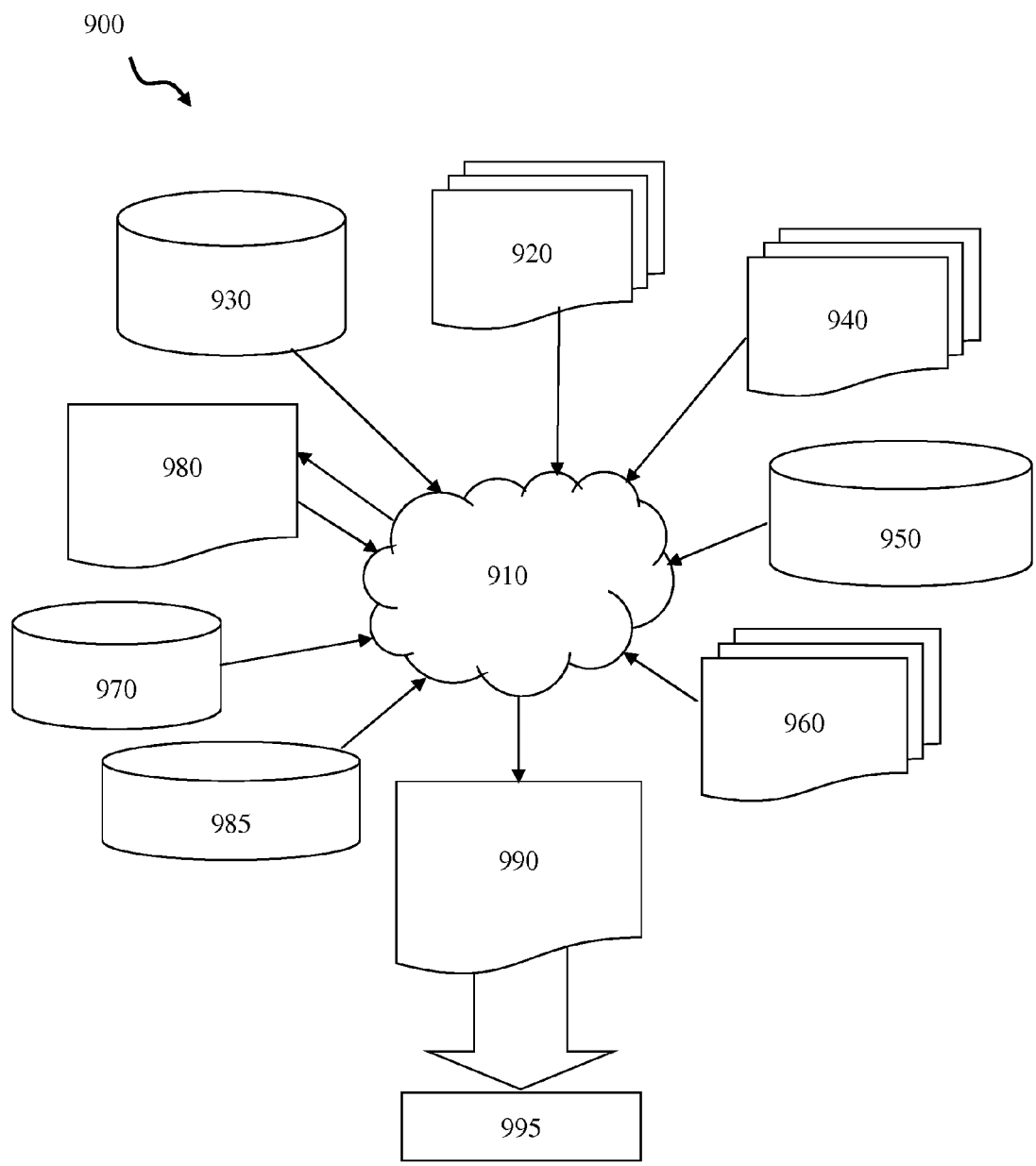
FIG. 6 is a flow diagram of a design process used in semiconductor design, manufacture, and/or test.

FIG. 6 is a flow diagram of a design process used in semiconductor design, manufacture, and/or test used with the system and method of the present invention. FIG. 6 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    defining a correlation between at least two parameters, wherein at least one parameter of the at least two parameters is from a first chip of a three-dimensional integrated chip stack and at least one parameter of the at least two parameters is from a second chip of the three-dimensional integrated chip stack;
    generating a covariance matrix based on the at least two parameters;
    calculating a new parameter or new parameter set using the covariance matrix;
    performing statistical static timing analysis (SSTA) such that the new parameter or the new parameter set is propagated into the SSTA; and
    determining whether timing targets for the three-dimensional integrated chip stack are achieved,
    wherein at least the generating the covariance matrix is performed using a processor;
    the correlation between the at least two parameters is determined based on a manufacturing sorting plan that includes a set correlation requirement between the first chip and the second chip; and
    the covariance matrix is indicative of the correlated at least two parameters and the set correlation requirement between the first chip and the second chip.

2. The method of claim 1, wherein the at least two parameters are defined based on a process binning plan for the three-dimensional integrated chip stack and design constraints of the three-dimensional integrated chip stack.

3. The method of claim 2, wherein the process binning plan is a selective voltage binning plan.

4. The method of claim 3, wherein the at least two parameters comprise a first process parameter for the first chip, a second process parameter for the second chip, and at least one voltage parameter.

5. The method of claim 4, wherein the calculating the new parameter or the new parameter set comprises calculating a correlation coefficient for the at least two parameters.

6. The method of claim 5, wherein the new parameter or the new parameter set is a linear combination of the at least two parameters.

7. The method of claim 1, wherein the covariance matrix is indicative of how well the at least one parameter from the first chip is correlated to the at least one parameter from the second chip.

8. The method of claim 1, wherein the at least two parameters include one or more process parameters and one or more voltage parameters for the first chip and the second chip of the three-dimensional integrated chip stack.

* * * * *